(12) United States Patent
Gaudet et al.

(10) Patent No.: US 10,189,084 B2
(45) Date of Patent: Jan. 29, 2019

(54) METHOD AND SYSTEM FOR FABRICATION OF HYDROGEN-PERMEABLE MEMBRANES

(71) Applicant: INSTITUT NATIONAL DE LA RECHERCHE SCIENTIFIQUE, Québec (CA)

(72) Inventors: Julie Gaudet, La Prairie (CA); Bruno Manuel Honrado Guerreiro, Montreal (CA); Jacques Tosques, Balma (FR); Lionel Roué, Sainte-Julie (CA); Daniel Guay, Saint-Lambert (CA)

(73) Assignee: INSTITUT NATIONAL DE LA RECHERCHE SCIENTIFIQUE, Québec (CA)

( * ) Notice: Subject to any disclaimer, the term of this patent is extended or adjusted under 35 U.S.C. 154(b) by 257 days.

(21) Appl. No.: 15/292,246

(22) Filed: Oct. 13, 2016

(65) Prior Publication Data
US 2017/0100773 A1  Apr. 13, 2017

Related U.S. Application Data

(60) Provisional application No. 62/240,618, filed on Oct. 13, 2015.

(51) Int. Cl.
*B22F 9/04* (2006.01)
*B22F 1/00* (2006.01)
*B01D 53/22* (2006.01)
*B01D 67/00* (2006.01)
*B01D 71/02* (2006.01)
*C22C 5/04* (2006.01)
(Continued)

(52) U.S. Cl.
CPC .......... *B22F 1/0085* (2013.01); *B01D 53/228* (2013.01); *B01D 67/0041* (2013.01); *B01D 71/022* (2013.01); *B22F 9/04* (2013.01); *C22C 5/04* (2013.01); *C22F 1/14* (2013.01); *C23C 24/04* (2013.01); *C23F 17/00* (2013.01); *B01D 2323/26* (2013.01); *B22F 2009/041* (2013.01); *B22F 2009/043* (2013.01); *B22F 2301/25* (2013.01); *B22F 2303/30* (2013.01)

(58) Field of Classification Search
CPC .. B22F 1/0085; B22F 9/04; C22F 1/14; C23C 24/04; C23F 17/00; C22C 5/04; B01D 67/0041; B01D 71/022
See application file for complete search history.

(56) References Cited

U.S. PATENT DOCUMENTS 3,350,845 A  11/1967  McKinley
3,439,474 A   4/1969  McKinley
(Continued)

FOREIGN PATENT DOCUMENTS

JP  H03267327 A  11/1991

OTHER PUBLICATIONS

Yen-Chang Tsai et al, Palladium based cermet composite for hydrogen separation at elevated temperature, Journal of Power Sources, 2015, pp. 965-970, vol. 274, Elsevier B.V., Taiwan.

*Primary Examiner* — Jessee R Roe
(74) *Attorney, Agent, or Firm* — Gwendoline Bruneau

(57) ABSTRACT

A method for fabrication of an hydrogen-permeable membrane, comprising forming an alloy of a target composition and structure from powders by mechanically alloying; and forming a membrane from the alloy of the target composition and structure.

12 Claims, 16 Drawing Sheets

(51) Int. Cl.
*C22F 1/14* (2006.01)
*C23C 24/04* (2006.01)
*C23F 17/00* (2006.01)

(56) References Cited

U.S. PATENT DOCUMENTS

| | | | | |
|---|---|---|---|---|
| 5,215,729 | A | * | 6/1993 | Buxbaum .............. B01D 53/22 |
| | | | | 423/248 |
| 6,267,801 | B1 | * | 7/2001 | Baake .................. B01D 53/228 |
| | | | | 55/DIG. 5 |
| 6,372,363 | B1 | | 4/2002 | Krueger |
| 2010/0092353 | A1 | | 4/2010 | Noda |

* cited by examiner

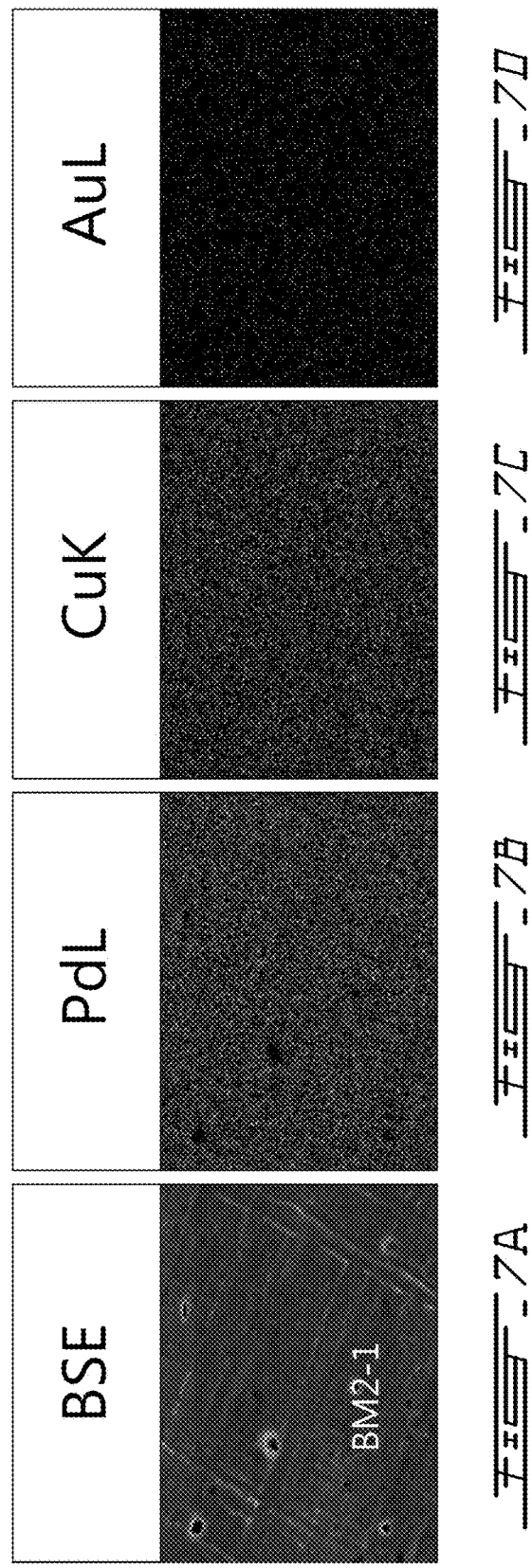

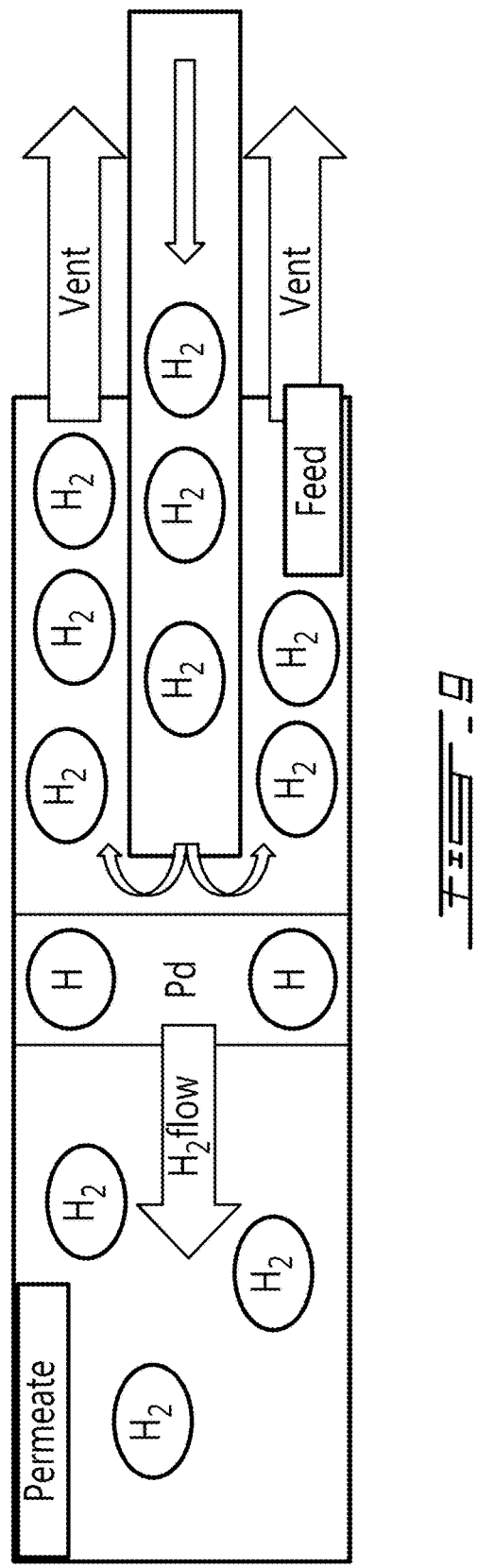

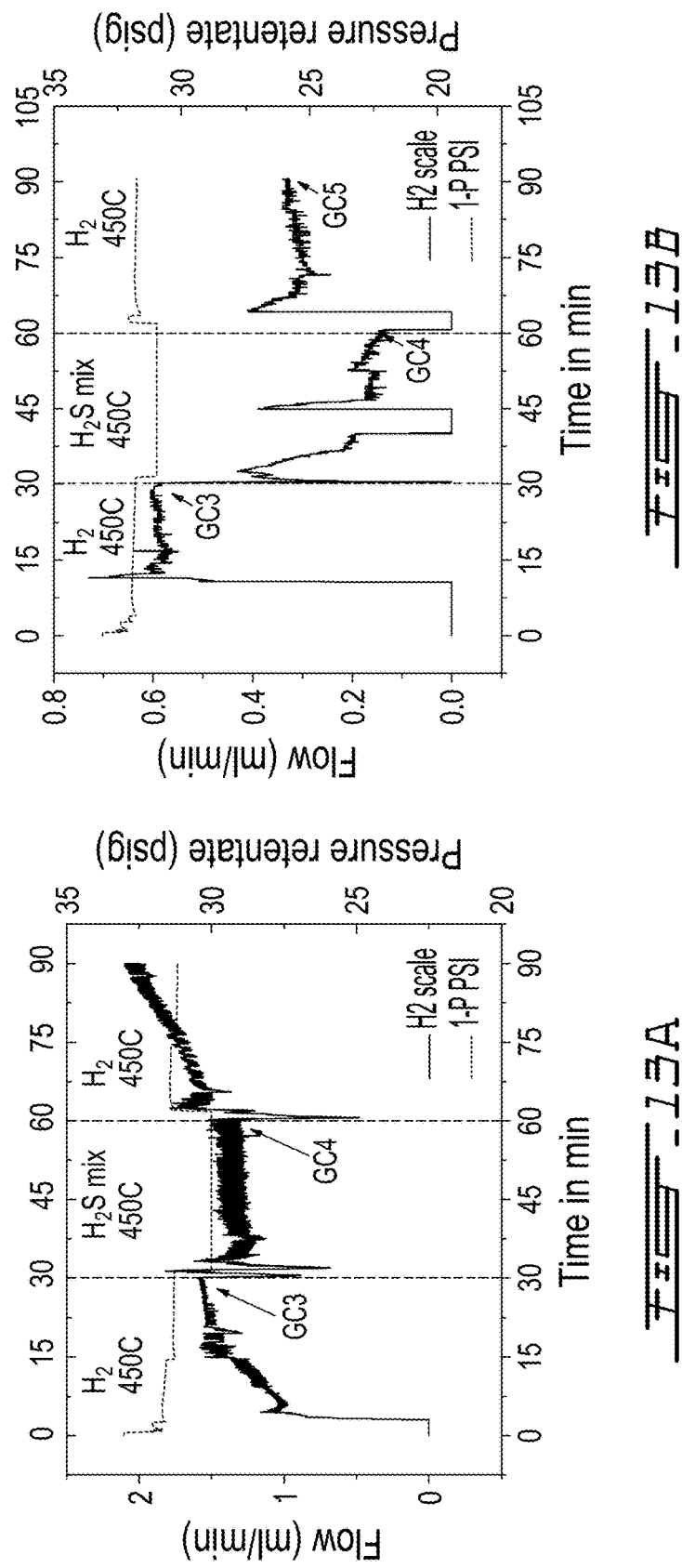

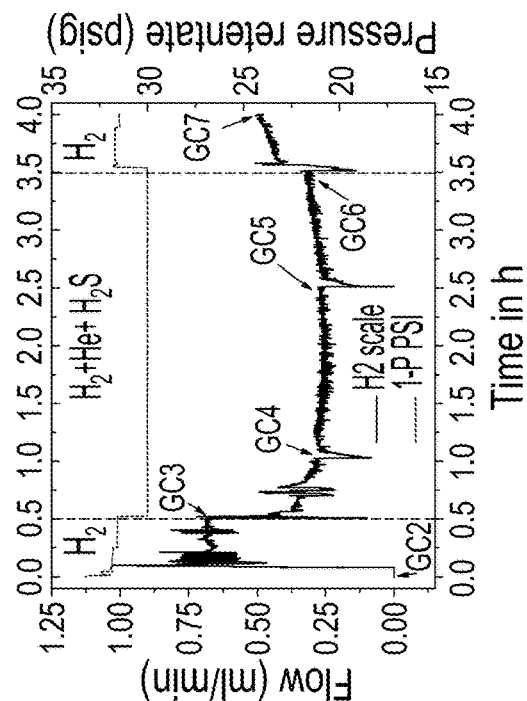
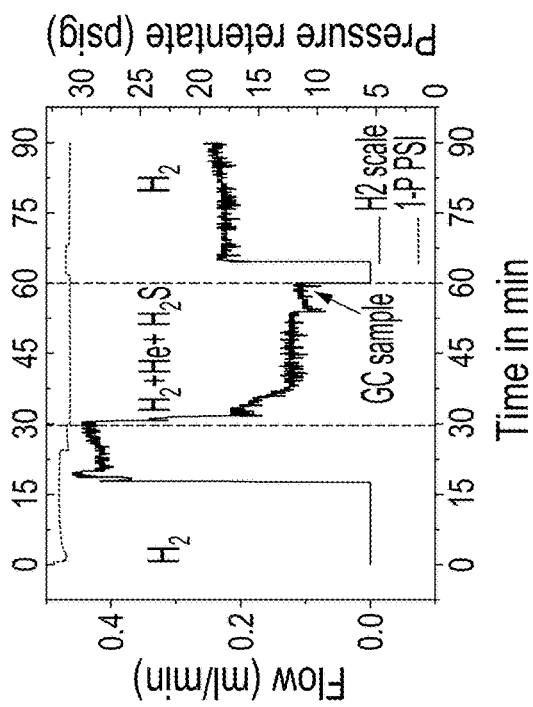
FIG-14B
FIG-14A

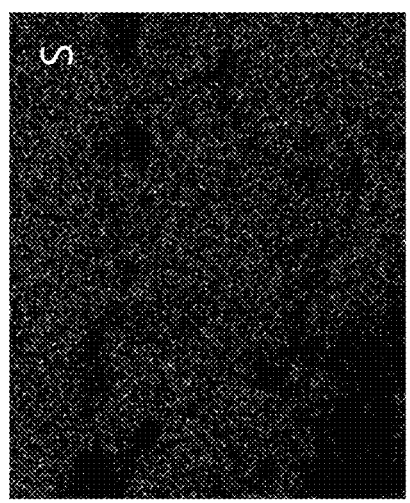
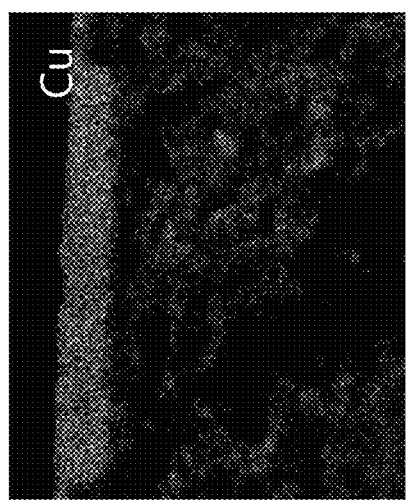
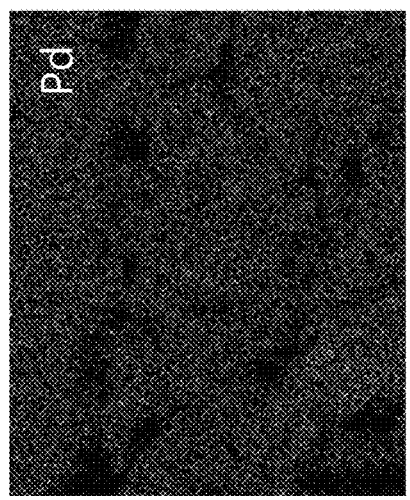
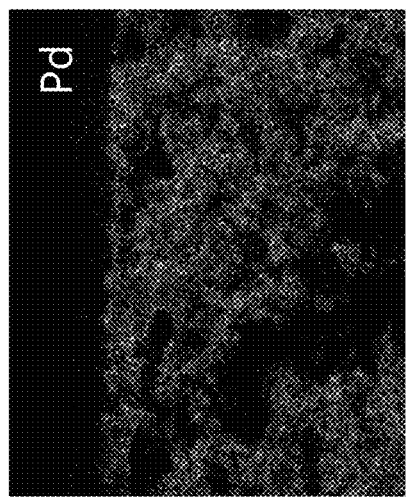
FIG-15A
FIG-15B
FIG-15C
FIG-15D
FIG-15E

METHOD AND SYSTEM FOR FABRICATION OF HYDROGEN-PERMEABLE MEMBRANES

CROSS REFERENCE TO RELATED APPLICATIONS

This application claims benefit of U.S. provisional application Ser. No. 62/240,618, filed on Oct. 13, 2015. All documents above are incorporated herein in their entirety by reference.

FIELD OF THE INVENTION

The present invention relates to hydrogen-permeable membranes. More specifically, the present invention is concerned with a method and a system for fabrication of hydrogen-permeable membranes.

BACKGROUND OF THE INVENTION

The increasing use of hydrogen in chemical industries and oil refining and clean technologies puts pressure on hydrogen sources, hydrogen production capacities and hydrogen supplies. $H_2$ is used for example for fuel desulfurization, production of ammonia $NH_3$, methanol and other alcohol, urea, hydrochloric acid HCl, in Fischer-Tropsch reactions, i.e. conversion of CO and $H_2$ into liquid hydrocarbon, as a reducing agent in metallurgy and for adding value to petroleum products and oils by hydrogenation. More than 41 million tons of $H_2$ are produced annually, of which 80% by steam reforming, partial oxidation and auto thermal reforming of natural gas. Renewable hydrocarbons and biogas are also used as starting sources.

Methane steam reforming (see relation 1 below) is performed at high temperature, typically between about 800° C. and about 900° C. The resulting $H_2$ and CO gas mixture is cooled down to a temperature in a range comprised between about 350° C. and 450° C. upon exiting a first reactor, and introduced in a second reactor where a water gas shift reaction (WGS) takes place (relation 2 below):

$$CH_4 + H_2O \rightarrow 3H_2 + CO \quad \text{(relation 1)}$$

$$CO + H_2O \leftrightarrows H_2 + CO_2 \quad \text{(relation 2)}$$

Then $H_2$ (40 mol %) is mixed with $CO_2$ (55 mol %), CO (3 mol %) and $H_2S$ (1-3 mol %) from the original hydrocarbons source.

A number of methods are known to separate and purify $H_2$, such as: i) cryogenic distillation, allowing a purity up to 95%, ii) separation using a polymer membrane, allowing a purity up to 98%, iii) adsorption on a molecular sieve or pressure swing adsorption (PSA), allowing a purity up to about 99.9%, and iv) separation using a metal membrane, allowing a purity of more than to about 99.95%.

In a number of applications such as in $H_2$ supply of fuel cells and specific files of specialized chemical industry, $H_2$ with a purity above 99.999% is needed. For example, fuel cells must be supplied with $H_2$ containing less than 100 ppm carbon monoxide or sulfur. In order to achieve such of purity levels, additional purification stages are needed after the stages of $H_2$ production. $H_2$ purification using metal membranes allow achieving high purity levels and thus look promising for such applications.

Purification by adsorption on a molecular sieve or pressure swing adsorption (PSA) is the most widely used method on production sites. In this method, each adsorbent bed goes through adsorption, depressurization, purging at low pressure and pressurization steps in a continuous operation of the pressure swing adsorption (PSA) unit. The gas flow and distribution among the beds is monitored by a complex network of valves and tubing, which makes the system delicate and the method expensive. Moreover, a dead load in the tubing and valves of the system significantly reduces the yield and efficiency of the method. Finally, the method requires cooling down the gas exiting the water gas shift (WGS) reactor from about 400° C. to 40° C. before going through the pressure swing adsorption (PSA) unit, which results in high energy losses.

In contrast, if the $H_2$ separation is done at high temperature, the purification could be integrated within the water gas shift (WGS) reactor or even within a steam reforming reactor, which would allow avoiding cooling of the gas, and therefore allow significant energy savings and method simplification.

$H_2$ separation at high temperature is possible using membranes that are permeable to hydrogen. In such a method, molecular $H_2$ at a temperature between about 450° C. and 500° C. is adsorbed at the surface of a membrane and dissociated into atomic H before diffusing within the membrane. Under the effect of the concentration gradient, the atomic H crosses the membrane and recombines on its opposite surface to form $H_2$. As the membrane is impermeable to the other species, i.e. CO, $CO_2$, etc. . . . , the membrane thus allows separating and purifying gas $H_2$ (see FIG. 1). In theory, in absence of openings in the membrane, an infinite selectivity can be achieved. $H_2$ separation occurs in a passive way, i.e. in absence of any mobile element, which makes the method very easy to operate and reliable. Such a method is very flexible and can easily be integrated with different types of reactors.

As hydrogen is soluble in palladium, palladium can be used for separation of hydrogen from other gases that are not soluble in palladium. However, at a high concentration of hydrogen in palladium, a phase transformation occurs which renders the membrane fragile. Moreover, Pd reacts with $H_2S$ present in the mixture of gases being separated and forms palladium sulfildes, causing a significant drop of $H_2$ solubility and therefore an efficiency drop of the separation method.

In order to overcome these problems, palladium-based alloys are used with different temperatures at which $H_2$ causes the above-mentioned phase transformation to increase the resistance to poisoning.

There are different methods available to prepare palladium-based alloys, namely metallurgical methods (vacuum arc melting, casting), physical vapor deposition (PVD) methods (magnetron sputtering, pulse laser deposition), electrochemical and electroless deposition. Generally, metallurgical methods are used for the preparation of stand-alone membranes, while the other methods mentioned above are preferred when preparing supported membranes on porous substrates. Metallurgical methods rely on long heat treatments at high temperatures to achieve homogenous alloys. Alloys can be formed in one single step with PVD techniques, however scaling up is not straightforward. Electroless deposition consists in chemically reducing target metal salts ions that deposit on the surface of a substrate. The reduction is done in sequence, and followed by a thermal treatment to favor diffusion of the metallic ions and alloy formation. Alternatively, metallic powders of pure elements may be mixed and pressed on the substrate before applying a thermal treatment forming an alloy. In both cases, the duration and temperature of the thermal treatment are adapted according to a desired alloy composition.

There is still a need in the art for a method and system for fabrication of hydrogen-permeable membranes.

SUMMARY OF THE INVENTION

More specifically, in accordance with the present invention, there is provided a method for fabrication of an hydrogen-permeable membrane, comprising forming an alloy of a target composition and structure from powders and forming a membrane from the alloy of the target composition and structure.

There is provided a method for fabrication of a Pd alloy hydrogen-permeable membrane, comprising forming a fcc PdCuAu ternary alloy by mechanical alloying from Pd, Cu, Au powders, promoting a phase transition from fcc to bcc by annealing, forming pellets of a resulting bcc PdCuAu alloy; and cold-rolling.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 7A shows BM2 after final annealing;
FIG. 7B shows EDX mapping for BM2 of FIG. 7A: PdL;
FIG. 7C shows EDX mapping for BM2 of FIG. 7A: CuK;
FIG. 7D shows EDX mapping for BM2 of FIG. 7A: AuL.

FIG. 9 show a schematic diagram of a permeation chamber for $H_2$ permeability measurement;

FIG. 13A shows results of gas mixture experiments ($H_2$—He 3%-941 ppm $H_2S$) for BM1-4-:$Pd_{40.1}Cu_{59.9}Au_0$;

FIG. 13B shows results of gas mixture experiments ($H_2$—He 3%-941 ppm $H_2S$) for BM15-4: $Pd_{38.8}Cu_{54.5}Au_{6.6}$;

FIG. 14A shows results of gas mixture experiments ($H_2$—He 3%-941 ppm $H_2S$) for BM4-2: $Pd_{39.8}Cu_{49.2}Au_{11}$;

FIG. 14B shows results of gas mixture experiments ($H_2$—He 3%-941 ppm $H_2S$) for BM4-5: $Pd_{39.8}Cu_{49.2}Au_{11}$ (FIG. 14B);

FIG. 15A and FIG. 15B shows EDX mapping of cross sections of the Pd 250 μm Alfa Aesar foil as commercially available membrane;

FIG. 15C, FIGS. 15D and 15E shows EDX mapping of cross sections of a BM3-1-$Pd_{39.2}Cu_{53.4}Au_{7.4}$ membrane prepared according to the present invention respectively.

DESCRIPTION OF EMBODIMENTS OF THE INVENTION

Figure 1:
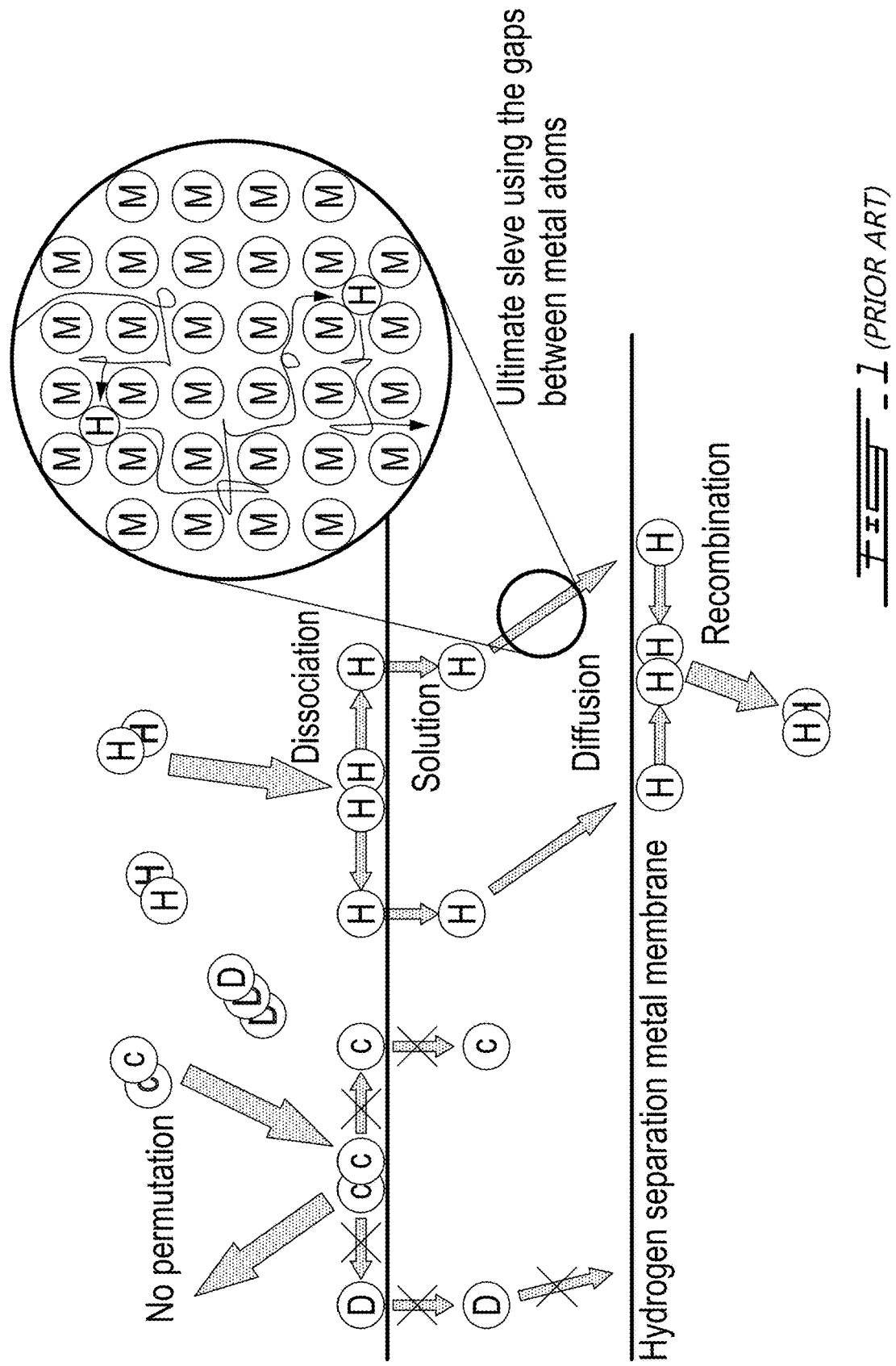
FIG. 1 schematically shows separation of hydrogen by a membrane, as known in the art.
Figure 2:
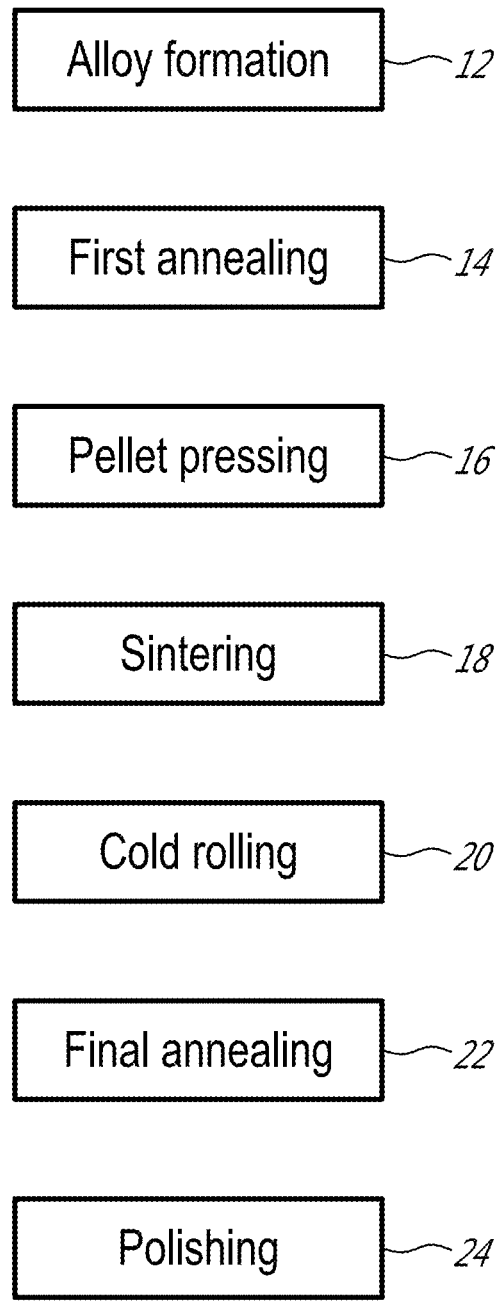
FIG. 2 is a flow chart of a method according to an embodiment of an aspect of the present invention.

FIG. 2 is a flow chart of a method according to an embodiment of an aspect of the present invention.

First PdCuAu ternary alloys (fcc) are formed by mechanical alloying from Pd, Cu, Au and NaCl (2 wt %) powders (step 12). A phase transition from fcc to bcc is promoted by annealing the PdCuAu alloy at 400° C. for 5 h under a mixture of Ar/5% $H_2$ (step 14). Then pellets are formed by pressing 300 mg of bcc PdCuAu alloy into a 1.1 cm disk with a thickness of approximately 450 μm using a load of 20 metric tons for 10 min in a hydraulic press (step 16). The resulting pellets are then sintered at 900° C. for 1 h under a mixture of Ar/5% $H_2$ (step 18), and then the surface of the pellets are homogenized by cold-rolling with a distance between rolls starting at 500 μm and decreased by steps of 25 μm (step 20). A final annealing is performed at 400° C. for 5 h under a mixture of Ar/5% $H_2$ (step 22), before polishing the pellets (step 24) to obtain an almost-mirror finish like surface.

Pd pellets are heat treated under pure Ar only (steps 14, 18 and 22) to avoid the formation of cracks during cool down.

Membranes thus obtained were tested under single gas conditions, first with He and then with $H_2$; a final He leak test was further performed. Membranes were considered leak free, meaning that no gas was permeating through defects or pinholes, when no flow was registered in the helium tests, i.e. flow below 0.005 ml/min, which was the resolution limit.

In step 12, Pd, Cu and Au powders were ball milled for at least 10 hours, i.e. for example 18h under Ar. NaCl was used as a process control agent. One stainless steel ball of 2 g and 2 stainless steel balls of 1 g were used. All solids were weighted and sealed under Ar. Ball milling was performed with no temperature control. Amounts of Pd, Cu, Au and NaCl used in 5 different compositions $BM_{1-5}$ are listed in Table 1 below:

TABLE 1

| Synthesis | Pd (g) | Cu (g) | Au (g) | NaCl (g) | Total solids (g) |
|---|---|---|---|---|---|
| BM1 | 1.034 | 0.926 | 0.000 | 0.04 | 2 |
| BM2 | 0.985 | 0.838 | 0.137 | 0.04 | 2 |
| BM3-BM5 | 0.927 | 0.733 | 0.300 | 0.04 | 2 |
| BM4 | 0.875 | 0.640 | 0.445 | 0.04 | 2 |

As can be seen by X-ray diffraction (XRD), ball milling promotes the formation of one single fcc PdCuAu alloy; in some cases, unalloyed metals can still be identified in the diffractograms (see Table 2 below). However, subsequent heat treatments guarantee complete alloying at all compositions (see Table 3 below).

TABLE 2

| | Pd (at %) | Cu (at %) | Au (at %) | Impurities* | XRD |
|---|---|---|---|---|---|
| BM1 | 39.2 | 60.8 | 0.0 | NaCl/Fe, Ni | fcc |
| BM2 | 41.0 | 56.1 | 2.9 | NaCl/Fe | fcc + Pd + Cu |
| BM3 | 39.8 | 52.7 | 7.5 | NaCl | fcc |
| BM4 | 39.4 | 50.5 | 10.1 | NaCl/Fe | fcc + Pd + Cu + (Au) |
| BM6 | 95 | — | — | 5 at % Na | Pd |

Figure 3A:
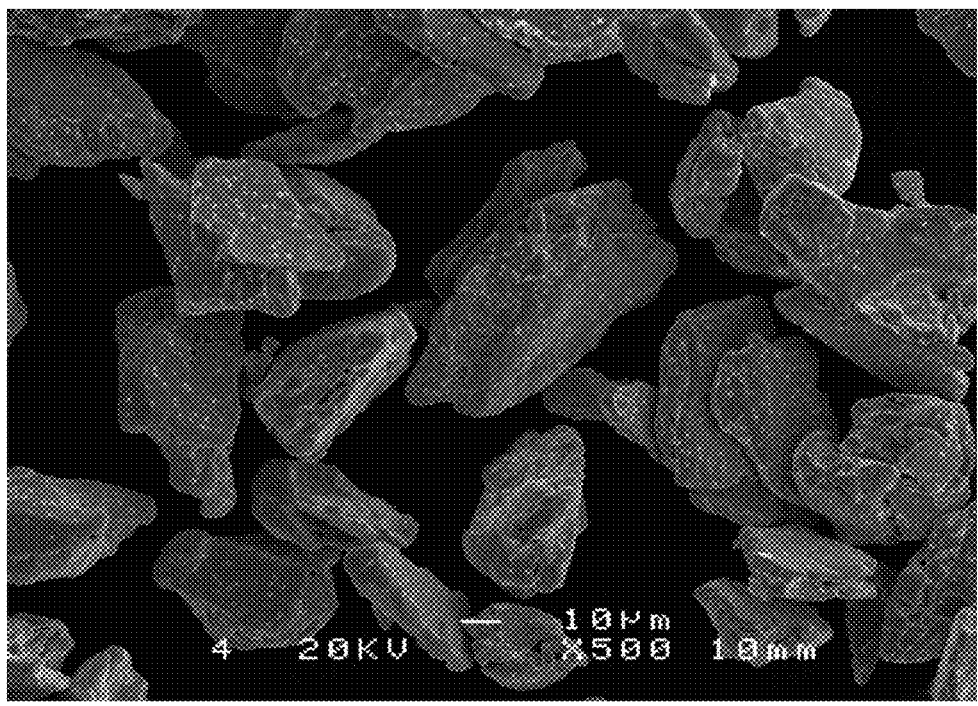
FIG. 3A is a SEM photograph of BM6 70-μm aggregates.
Figure 3B:
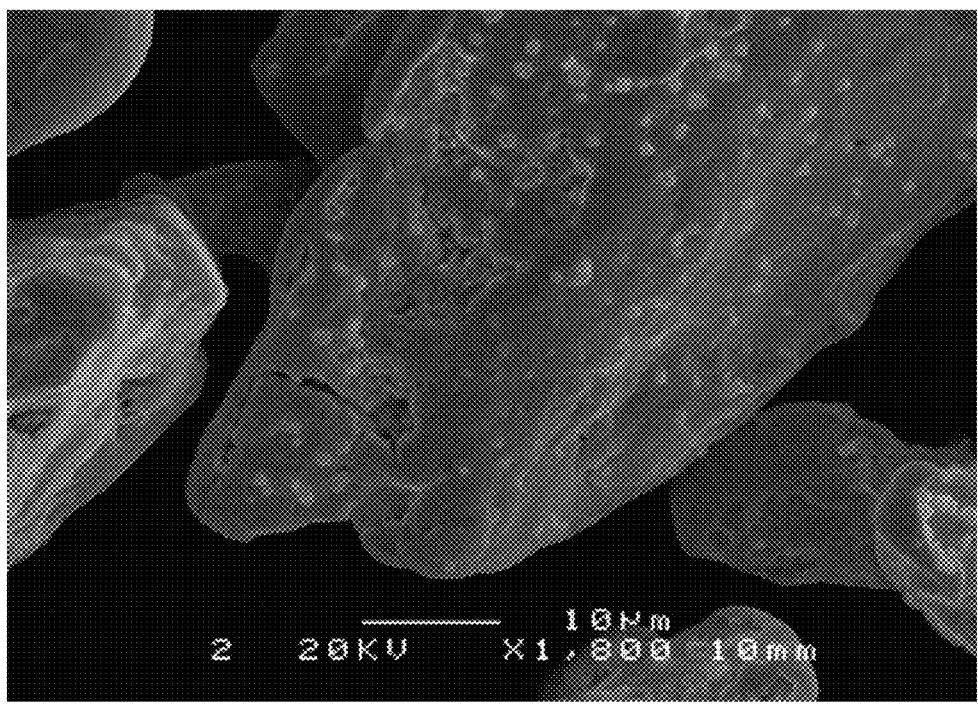
FIG. 3B is a SEM photograph of the BM6 70-μm aggregates of FIG. 3A at a larger magnification.

As can be seen in the electron microscopy (SEM) photographs of FIG. 3 representative of the aggregates of BM1-BM6, aggregates 70 µm and below are obtained. The composition of the alloys does not seem to have an effect on the size or shape of the aggregates.

Figure 4B:
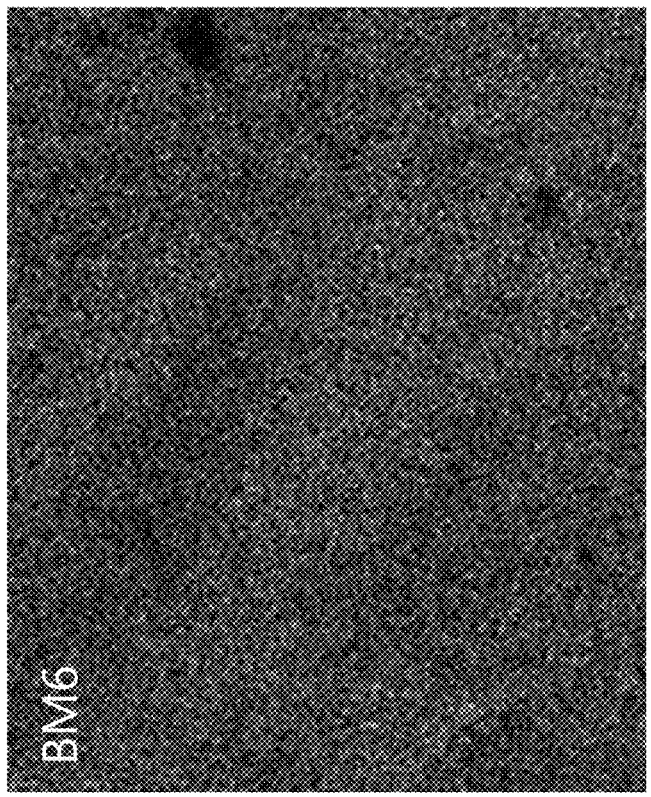
FIG. 4B shows an EDX mapping of BM6 powder after ball milling: Pd Lα1.
Figure 4A:
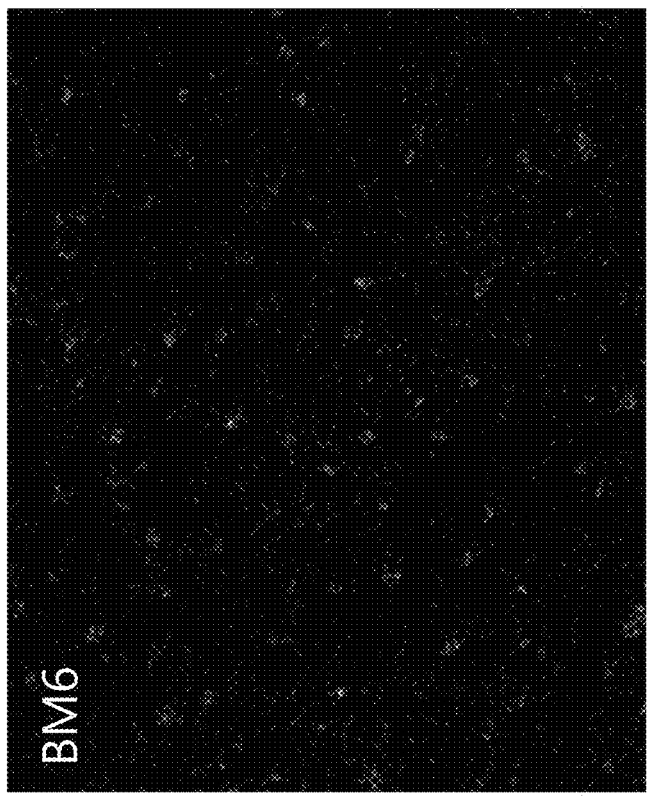
FIG. 4A shows an EDX mapping of BM6 powder after ball milling: Na Kα1.

Element distribution images (EDX) of BM6 powder after ball milling shown in FIG. 4 suggest that NaCl is dispersed on the surface of palladium forming granules 2 µm long.

Figures 5A, 5B, 5C, 5D:
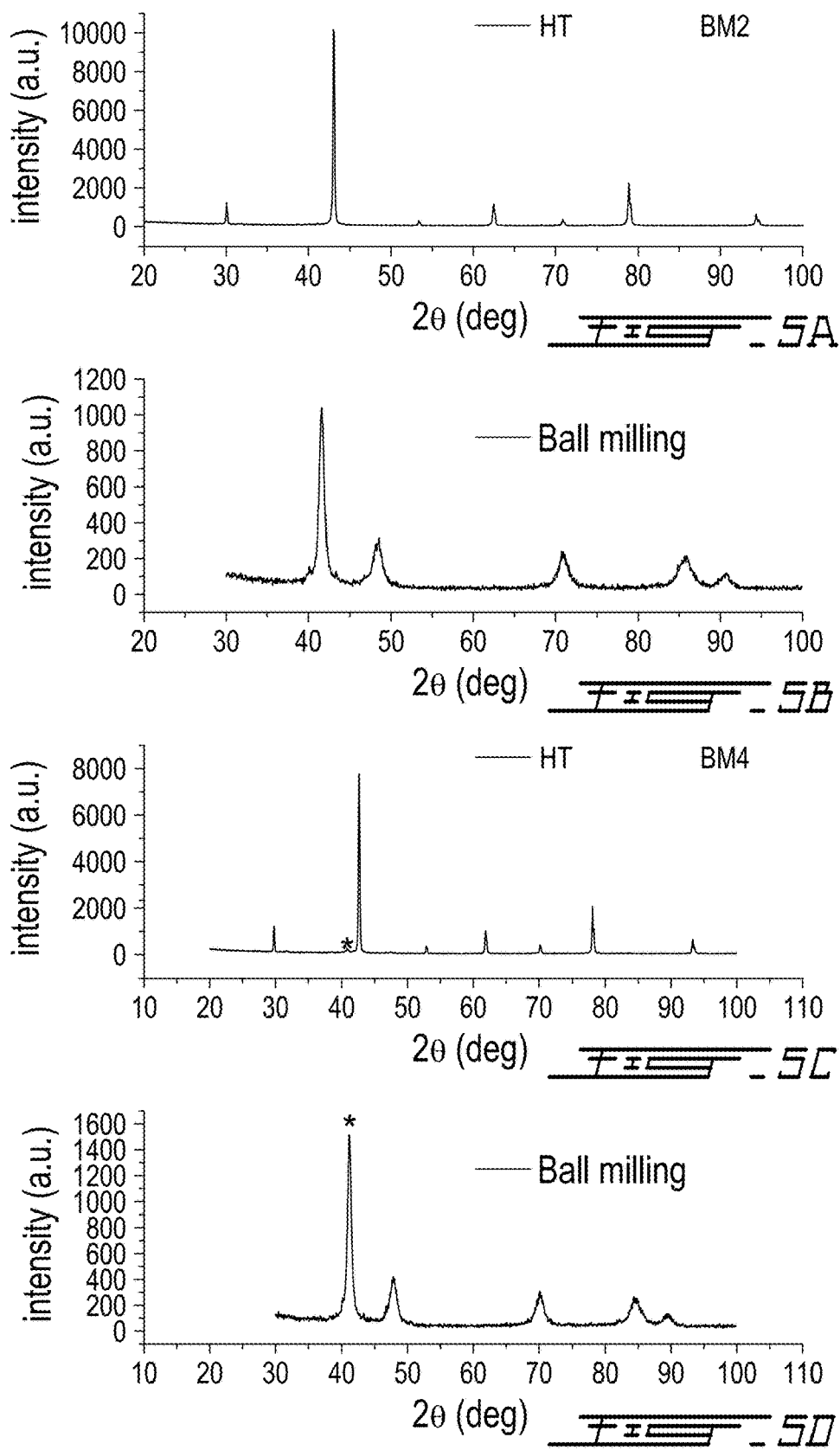
FIG. 5A shows a XRD graph of a powder with composition Pd41.0Cu56.1Au2.9 after ball milling.
FIG. 5B shows a XRD graph of an alloy with composition Pd41.0Cu56.1Au2.9 after first annealing.
FIG. 5C shows a XRD graph of a powder with composition Pd39.4Cu50.1Au10.1 after first ball milling.
FIG. 5D shows a XRD graph of an alloy with composition Pd39.4Cu50.1Au10.1 after first annealing.

In step 14, heat treatment is performed at 400° C. under Ar 5% H2 for 5 hours. Complete transition from fcc to bcc phase may occur depending on the alloy composition. Unalloyed metals are no longer observed in XRD (see FIG. 5 [svp précisez légende de chaque figure, merci] and Table 3 below).

TABLE 3

| | Pd (at %) | Cu (at %) | Au (at %) | XRD after $1^{st}$ HT |
|---|---|---|---|---|
| BM1 | 39.2 | 60.8 | 0.0 | bcc |
| BM2 | 41.0 | 56.1 | 2.9 | bcc |
| BM3 | 39.8 | 52.7 | 7.5 | bcc |
| BM4 | 39.4 | 50.5 | 10.1 | fcc + bcc |

In step 16, 300 mg of bcc PdCuAu alloy was pressed into a 1.1 cm disk and about 450 µm thick using 20 metric tons for 10 min.

In step 18, the resulting pellets were sintered at 900° C. for 1 h under a mixture of Ar/5% H2.

In step 20, the thickness of the pellets was decreased and homogenized by cold rolling, with a distance between rolls starting at 500 µm and decreased by steps of 25 µm.

Table 4 below shows measurements taken on different days before and after cold rolling. Only the results of membranes that showed 0 ml/min flow under He are shown.

TABLE 4

| | Thickness (um) | |
|---|---|---|
| Membrane | Before CR | After CR* |
| BM1-2 | 477 | 362 |
| BM2-2 | 449 | 354; 359# |
| BM4-2 | 421 | 307; 319# |
| BM5-2 | 548 | 440 |

Figures 6A, 6B, 6C:
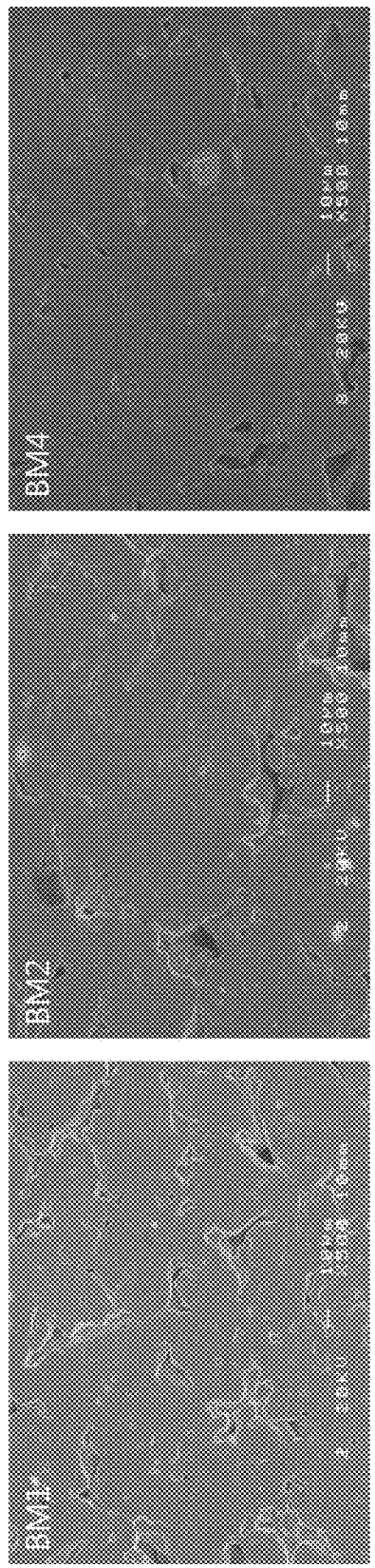
FIG. 6A is a SEM picture of BM1 pellets after final annealing.
FIG. 6B is a SEM picture of BM2 pellets after final annealing.
FIG. 6C is a SEM picture of BM3 pellets after final annealing.

In step 22, the membranes were annealed at 400° C. for 5 h under Ar/5% H2. SEM, EDX composition and XRD analysis were performed. Fe content was found to be below 1 at %; there was no clear evidence for the presence of NaCl (see Table 5 below and FIG. 6).

TABLE 5

| | Pd (at %) | Cu (at %) | Au (at %) | XRD after 2nd annealing |
|---|---|---|---|---|
| BM1 | 40 | 60 | 0.0 | Bcc |
| BM2 | 40 | 57 | 3 | Bcc |
| BM3 | 39 | 53 | 7 | bcc(+fcc??) |
| BM4 | 40 | 49 | 11 | bcc + fcc |
| BM5 | 39 | 54 | 7 | bcc |

Figures 7E, 7F, 7G, 7H:
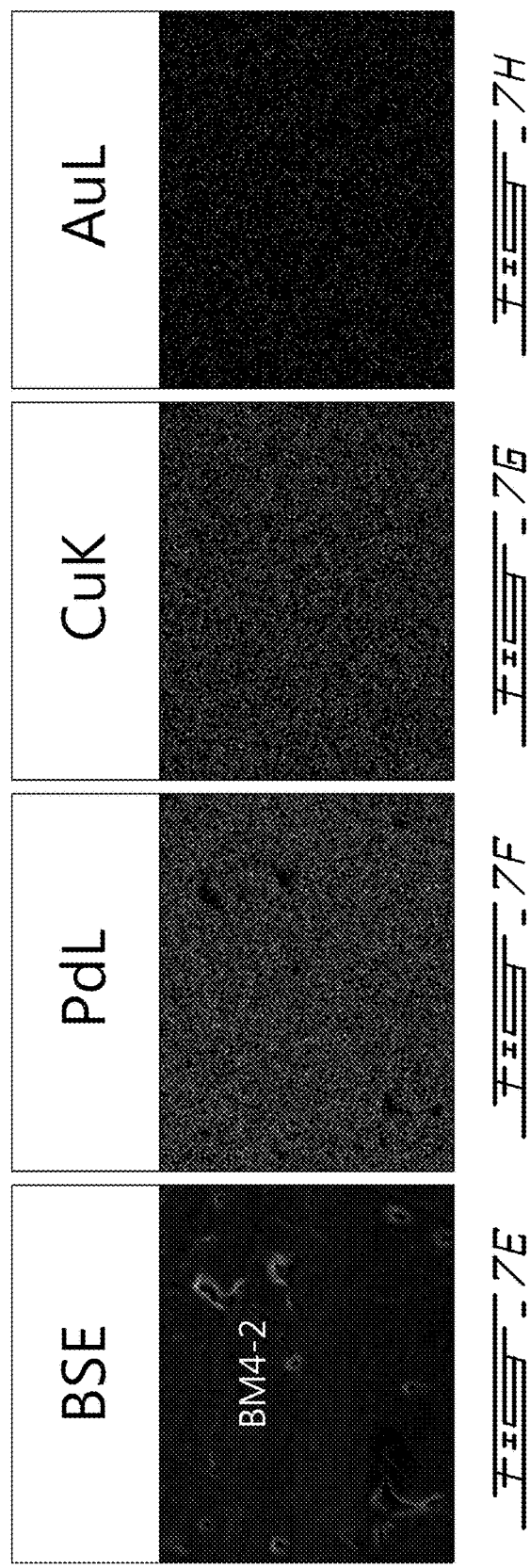
FIG. 7E shows BM4 after final annealing.
FIG. 7F shows EDX mapping for BM4 of FIG. 7E: PdL.
FIG. 7G shows EDX mapping for BM4 of FIG. 7E: CuK.
FIG. 7H shows EDX mapping BM4 of FIG. 7E: AuL.

FIG. 7 show EDX mapping after final annealing. EDX mapping shows homogenous distribution of all 3 elements Pd, Cu and Au throughout the membrane (Images taken at 2500 times magnification).

Figure 8A:
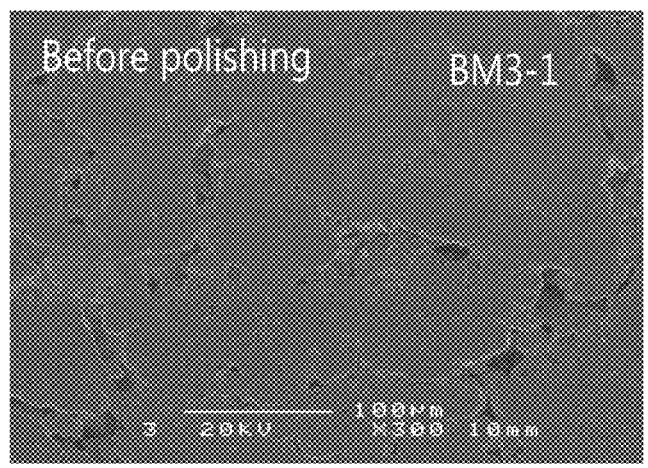
FIG. 8A is a SEM micrograph of a BM3 membrane before polishing.
Figure 8B:
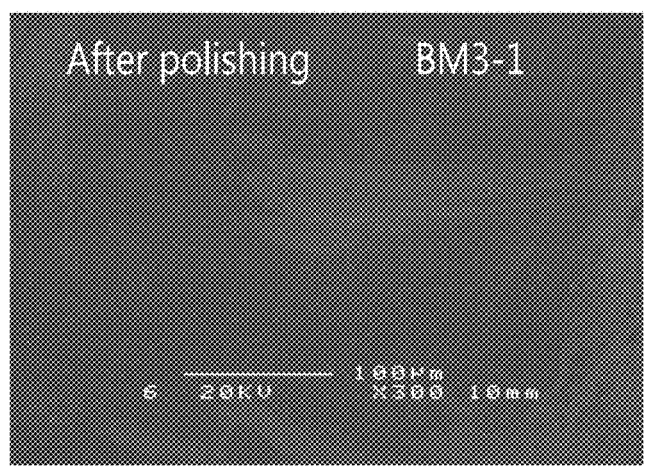
FIG. 8B is a SEM micrograph after polishing at a first location on the surface of the membrane of FIG. 8A.
Figure 8C:
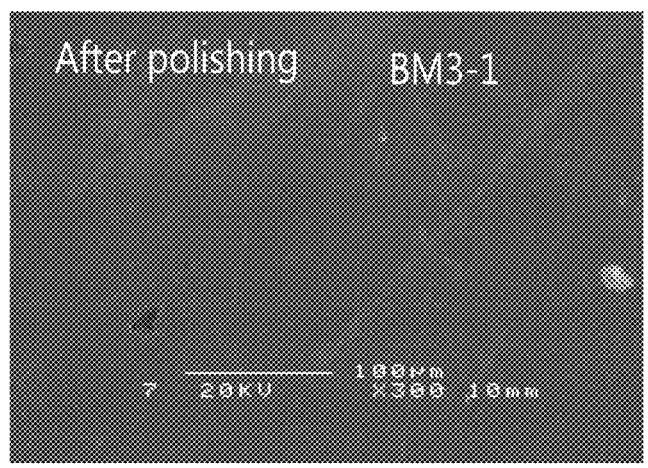
FIG. 8C is a SEM micrograph after polishing at a second location on the surface of the membrane of FIG. 8A, showing that some imperfections have remained after polishing.

In step 24, all membranes were polished using SiC sanding paper (P800-P1500-P2500). Polishing was finished with $Al_2O_3$ 1 µm paste on a microcloth. Both sides of the membranes were polished. It was found that polishing decreases defects and pinholes on the surface of the membranes, making the membranes more selective. For example, the flow under 60 psig He may be reduced from 0.80 ml/min to less than 0.005 ml/min (detection limit of He mass flow meter) by polishing (see FIG. 8). Diamond paste (6 µm and 1 µm) was used instead of SiC sanding paper P2500 and $Al_2O_3$, when polishing pure Pd pellets.

Table 6 below shows the thickness in µm of the membranes obtained after polishing:

TABLE 6

| Membrane # | After polishing (um) |
|---|---|
| BM1-2 | 327 |
| BM2-2 | 300 |
| BM4-2 | 304 |
| BM5-2 | 277 |

Then $H_2$ permeability was measured, using the configuration of a permeation chamber as shown in FIG. 9, operated in dynamic mode, i.e. with a constant flow of gas in the feed side (excess is vented to exit), at a temperature of about 350-450° C. (from furnace display), a pressure on feed side below 100 psig (7.8 atm), 3 MF ($H_2$ 0-100 ml/min; $H_2$ 0-20 ml/min; He 0-5 ml/min; detection limit of He MF: 0.005 ml/min); 2 pressure gauges (feed/permeate).

Figure 10A:
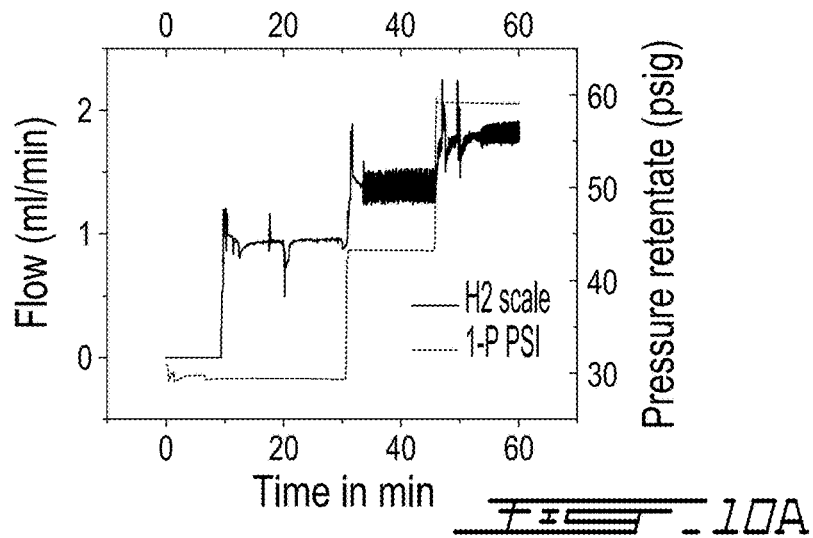
FIG. 10A shows variation of $H_2$ flow with time at 30, 45 and 60 psig H2 single-gas feed pressure and 464° C. (pressure values on the y axis on the right side), the permeate side not submitted to any pressure control and no sweeping gas being used, measurements performed with a 277 μm membrane with composition $Pd_{40.1}Cu_{53.1}Au_{6.8}$ prepared according to the present invention.
Figure 10B:
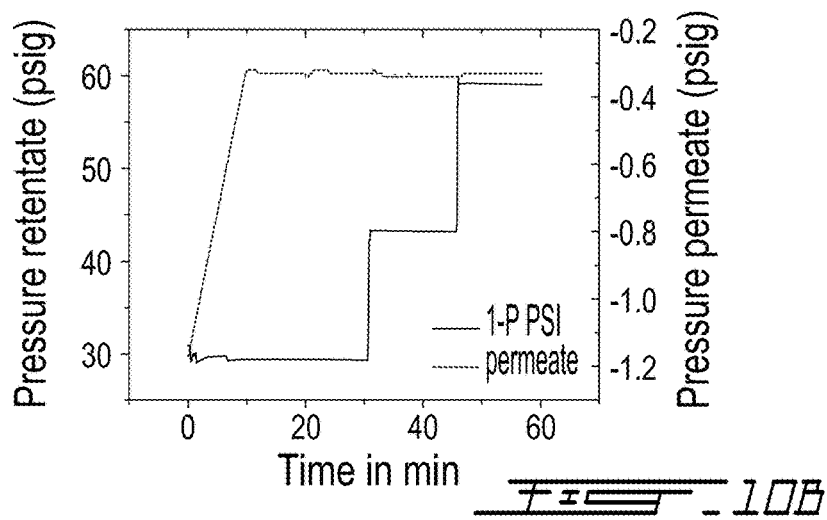
FIG. 10B shows evolution pressure on both the retentate and permeate sides of a the membrane of FIG. 10A in function of time.
Figure 10C:
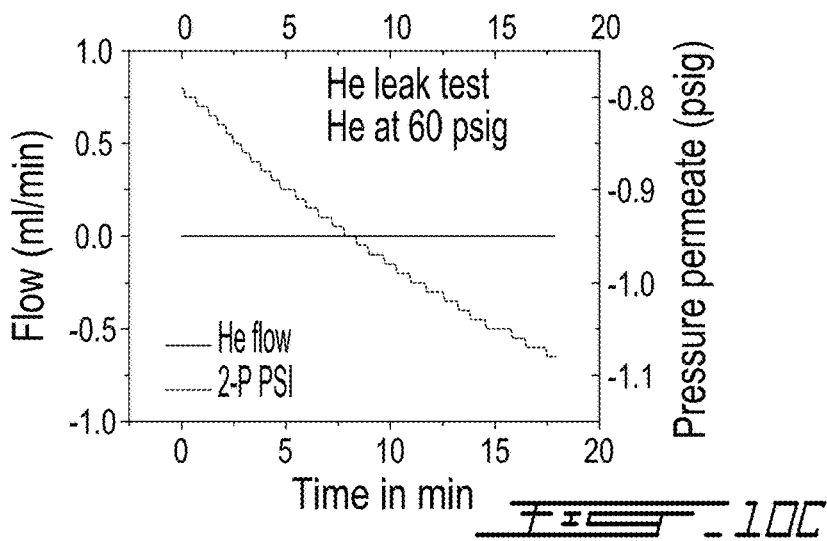
FIG. 10C shows results of an helium leak test performed on the membrane of FIG. 10A.

FIG. 10 show single gas experiments for BM5-2, of a composition of $Pd_{40.1}Cu_{53.1}Au_{6.8}$. This membrane failed the initial He leak test, but was successfully repaired by cold rolling, annealing and polishing. Final thickness was 277 μm. The membrane was assembled in the permeation chamber between two stainless steel gaskets for support. The chamber was subsequently degassed by alternating three times 5 min vacuum with 30 psig Ar. Afterwards the temperature was raised to 50° C. while keeping Ar inside the furnace at atmospheric pressure. Finally, 10 psig $H_2$ was introduced and the temperature was raised to 450° C.

Ideal selectivity is used when operating with single gases as:

$$\alpha^*_{H2/He} = \frac{Permeability_{H2}}{Permeability_{He}}$$

The separation factor for gases in mixtures, also called the selectivity of the membrane, $\alpha_{H_2,j}$, is given by the mole fractions of the components in the feed (x) and in the permeate (y):

$$\alpha_{H_2,j} = \frac{y_{H_2}/y_j}{x_{H_2}/x_j}$$

TABLE 7

| G1 (psig) | G2 (psig) | Flow (ml/min) | Permeability (mol · m$^{-1}$ · s$^{-1}$ · Pa$^{-0.5}$) | α* |
|---|---|---|---|---|
| He 57.7 | −1.17 (ΔP = −0.3) | <0.005 | <5.0 × 10$^{-11}$ | |
| 29.32 | −0.33 | 0.89 | 2.3 × 10$^{-8}$ | >469 |
| 43.16 | −0.34 | 1.39 | (R$^2$ = 0.9980) | |
| 59.06 | −0.33 | 1.82 | | |
| He 58.48 | −1.08 (ΔP = −0.28) | <0.005 | 4.9 × 10$^{-11}$ | |

Table 7 gives the data of each point of FIG. 10.

Figure 11:
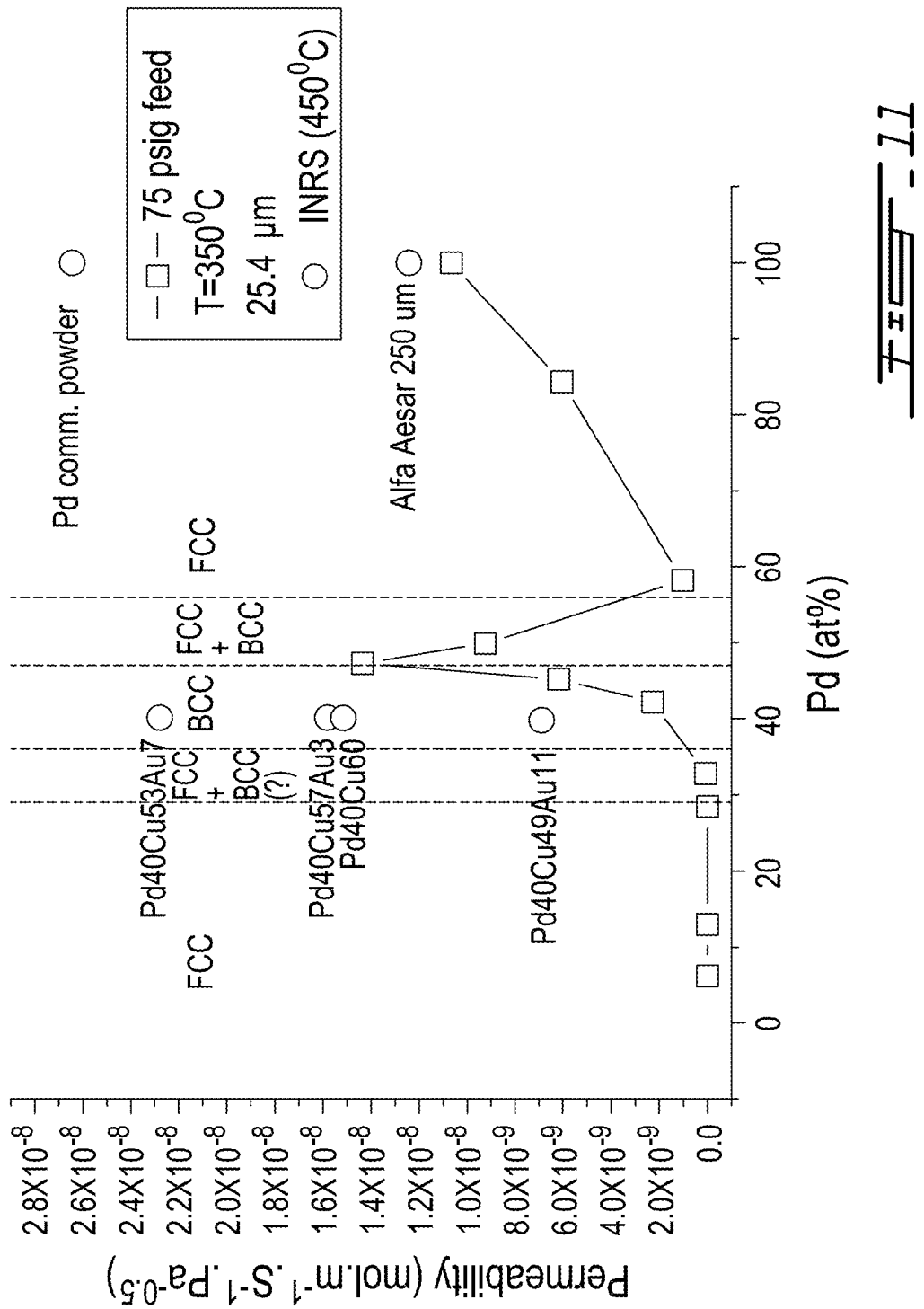
FIG. 11 shows a summary of single-gas permeability measurement results.

FIG. 11 shows a summary of single-gas permeability measurement results (circles), with a pressure on retentate of 30-60 psig and permeate at atmospheric pressure. Results by McKinley (U.S. Pat. No. 3,439,474-1969) are also shown (squares), for measurements performed on 25.4 μm foils supported on porous stainless steel substrates, and permeate at atmospheric pressure.

Figure 12B:
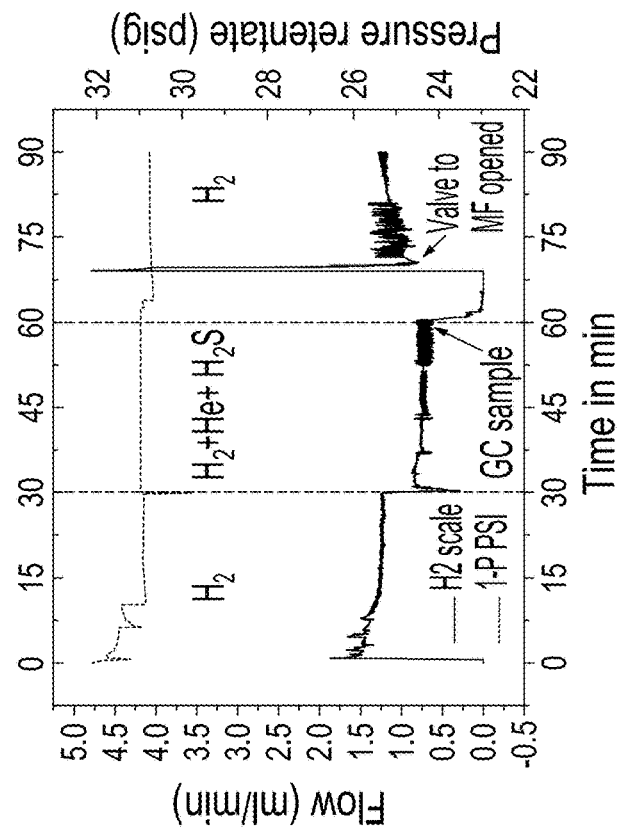
FIG. 12B shows gas mixture experiments ($H_2$—He 3%-941 ppm $H_2S$) for Pd pellets from commercial Pd powder.
Figure 12A:
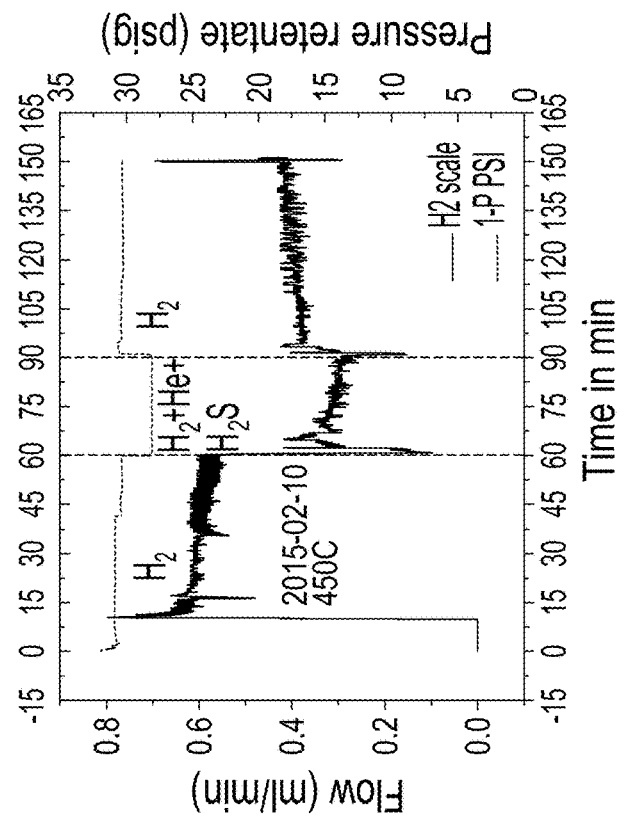
FIG. 12A shows gas mixture experiments ($H_2$—He 3%-941 ppm $H_2S$) for Pd 250 μm Alfa Aesar foil.

FIG. 12 show results of gas mixture experiments ($H_2$—He 3%-941 ppm $H_2S$) for a Pd 250 μm Alfa Aesar foil membrane as commercially available (FIG. 12A) and for Pd pellet from a commercial Pd powder (FIG. 12B). In the first case (FIG. 12A), a 50% decrease in permeability was observed at time 60 min in the presence of $H_2S$ 941 ppm and switching to pure $H_2$ at time 90 min allowed a recovery of 70% of the initial permeability; no He was detected downstream. In the second case (FIG. 12B), a 47% decrease in permeability was observed in the presence of $H_2S$ 941 ppm at time 30 min; and switching to pure $H_2$ at time 60 min allowed a complete recovery to the initial permeability with a final selectivity α=27.6.

FIG. 13 show results of gas mixture experiments ($H_2$—He 3%-941 ppm $H_2S$) for BM1-4: $Pd_{40.1}Cu_{59.9}Au_0$ (FIG. 13A), and for BM5-4: $Pd_{38.8}Cu_{54.5}Au_{6.6}$ (FIG. 13B). In the first case (FIG. 13A), a 12% decrease in permeability was observed at time 30 min in the presence of $H_2S$ 941 ppm and the membrane ruptured at the end. In the second case (FIG. 13B), a 74% decrease in permeability was observed in the presence of $H_2S$ 941 ppm at time 30 min and switching to pure $H_2$ at time 60 min allowed a 58% recovery to the initial permeability with a final selectivity α=1.

FIG. 14 show results of gas mixture experiments ($H_2$—He 3%-941 ppm $H_2S$) for BM4-2: $Pd_{39.8}Cu_{49.2}Au_{11}$ (FIG. 14A) and for BM4-5: $Pd_{39.8}Cu_{49.2}Au_{11}$ (FIG. 14B). In the first case (FIG. 14A), a 75% decrease in permeability was observed at time 30 min in the presence of $H_2S$ 941 ppm and switching to pure $H_2$ at time 60 min allowed a 55% recovery to the initial permeability. In the second case (FIG. 14B), a 48% decrease in permeability was observed in the presence of $H_2S$ 941 ppm and switching to pure $H_2$ allowed a 71% recovery to the initial permeability with a final selectivity α=1.9.

FIG. 15 show EDX mapping of cross sections of the Pd 250 μm Alfa Aesar foil membrane as commercially available (FIGS. 15A, 15B) and of a BM3- 1-$Pd_{39.2}Cu53.4Au7.4$ membranes prepared according to the present invention respectively (FIGS. 15C-15E), all being heat treated with $H_2S$ for 15 min at 450° C.

In the case of Alfa Aesar foil membrane as commercially available, FIGS. 15A and 15B show an homogeneous distribution of Pd (FIG. 15A) and S (FIG. 15B) within the bulk of the membrane, which may compromise the efficiency of the membrane for separating hydrogen.

In the case of the $Pd_{39.2}Cu_{53.4}Au_{7.4}$ membrane prepared according to the present invention, FIGS. 15D and 15E respectively show that Cu and S segregate on the surface of the membrane. As such, these surface elements may be removed by cleaning of the membrane; with only less than about 10% of the elements Cu or S being found in the bulk of the membrane, the membrane may still be efficient for separating hydrogen.

There is thus provided a method for the production of $H_2$ permeable membranes from ball milled powders. The method allows producing membranes of a thickness comprised in a range between 277 μm and 327 μm.

Four different compositions of PdCuAu alloys were tested. About 4 compositions in 10 were found to pass initial leak tests (pellets of PdCuAu alloys).

Tests performed using Pd—Cu, Pd—Cu—Ag and Pd—Cu—Au showed that the membranes obtained had a composition very similar to the powder initially used to form the alloy after milling. This allows controlling the composition of the membrane by controlling the composition of the initial powder mixture. Membranes with composition Pd40Cu(60-x)Aux with x=0, 3, 7 and 11 at % were formed.

A last polishing step was found to allow obtaining highly hydrogen selective membranes; it was shown that membranes that developed leaks during testing could be regenerated by polishing. Selectivity of the membranes under pure hydrogen conditions, called ideal selectivity, was higher than 130; after re-polishing a selectivity higher than 469 was obtained. Selectivity in the presence of $H_2S$ is below 28.

The lowest He flow that was possible to measure was 0.005 ml/min. This corresponds to a permeability of He below 5×10$^{-9}$ mol·m$^{-1}$·s$^{-1}$·Pa$^{-0.5}$. Consequently, ideal selectivity factors are above 130. Preliminary gas chromatography (GC) measurements showed that 6 ppmv He is present in the permeate side of a membrane prepared from commercial Pd powder after 15 min under 45 psig He. Comparatively, a commercial Pd 250 μm foil shows under the same conditions a He content below 1 ppmv. Obtained hydrogen permeability, under pure hydrogen gas conditions, varied between $6.9 \times 10^{-9}$ mol m$^{-1}$ s$^{-1}$ Pa$^{-0.5}$ and $2.1 \times 10^{-8}$ mol m$^{-1}$ s$^{-1}$ Pa$^{-0.5}$.

The selectivity considerably decreases in the presence of H$_2$S; the longer the time of exposure to H$_2$S gas mixture, the lower the selectivity. This is specific to the PdCuAu alloys and to the experimental conditions (temperature, pressure and H$_2$S concentration) and is not related to the method used to prepare the membranes.

In the presence of pure H$_2$S, copper, and possibly gold, segregate to the surface. This creates a layer that binds to sulfur preventing it from fully migrating to the bulk of the membrane, as it happens with pure Pd. The higher the Au content of the membrane, the lower the S content in the bulk. As the S-contaminants remain mostly on the surface, a cleaning method may be designed to recover the initial activity of the membrane.

However, the Cu—S— and possibly Au layer on top of the membrane may prevent H$_2$ permeation.

The present method comprises formation of an alloy of a target composition and structure directly from mechanically alloying the precursor powders using ball milling technique. More precisely, the method comprises pressing and sintering the obtained powder, before cold-rolling and polishing.

Cold spray, colloidal spray or paste painting may also be contemplated to prepare membranes supported on porous substrates from the mechanically alloyed powders.

The present alloy preparation method, being an out of equilibrium method, allows fabricating membranes with compositions that cannot be reached using conventional methods, such as membranes in metastable alloys, extended solid solution etc . . . , which in turn allows tailoring specific membrane shaving target properties, in terms of H$_2$ permeability for example.

Large quantities of powder may be prepared simultaneously, depending on the size of the crusher used, which may have a capacity of up to Kg in industrial settings.

There is generally provided a method for preparation of palladium alloys from powders by mechanical alloying. There is provided a method for fabrication of hydrogen-permeable membranes from alloy powders produced by ball milling.

The scope of the claims should not be limited by the embodiments set forth in the examples, but should be given the broadest interpretation consistent with the description as a whole.

The invention claimed is:

1. A method for fabrication of an hydrogen-permeable membrane, comprising:
   a) forming an alloy of a target composition and structure from powders; and
   b) forming a membrane from the alloy of the target composition and structure.

2. The method of claim 1, wherein said step a) comprises mechanically alloying the powders.

3. The method of claim 1, wherein said step a) comprises mechanically alloying the powders and annealing the alloy.

4. The method of claim 1, said step a) comprises ball milling the powders.

5. The method of claim 1, said step a) comprises ball milling the powders and heat treatment.

6. The method of claim 1, wherein said step b) comprises forming the membrane by cold rolling.

7. The method of claim 1, wherein said step b) comprises forming the membrane by one of: cold spraying, colloidal spraying and paste painting the alloy of the target composition and structure on a substrate.

8. The method of claim 1, for fabrication of a Pd alloy hydrogen-permeable membrane, said step a) comprising mechanically alloying at Pd with at least one of Cu, Au and Ag powders.

9. The method of claim 1, wherein said step a) comprises mechanically alloying Pd, Cu, and Au powders into a fcc PdCuAu alloy and annealing into a bcc PdCuAu alloy.

10. The method of claim 1, for fabrication of a PdCuAu alloy hydrogen-permeable membrane, said step a) comprising mechanically alloying at least Pd and Cu, and Au powders into a fcc PdCuAu ternary alloy and annealing into a bcc PdCuAu ternary alloy, said step b) comprising cold rolling pellets of the bcc PdCuAu ternary alloy.

11. The method of claim 1, further comprising at least one of annealing the membrane and polishing the membrane.

12. The method of claim 1, further comprising cold rolling, annealing and polishing the membrane.

* * * * *